United States Patent Office 2,791,269
Patented May 7, 1957

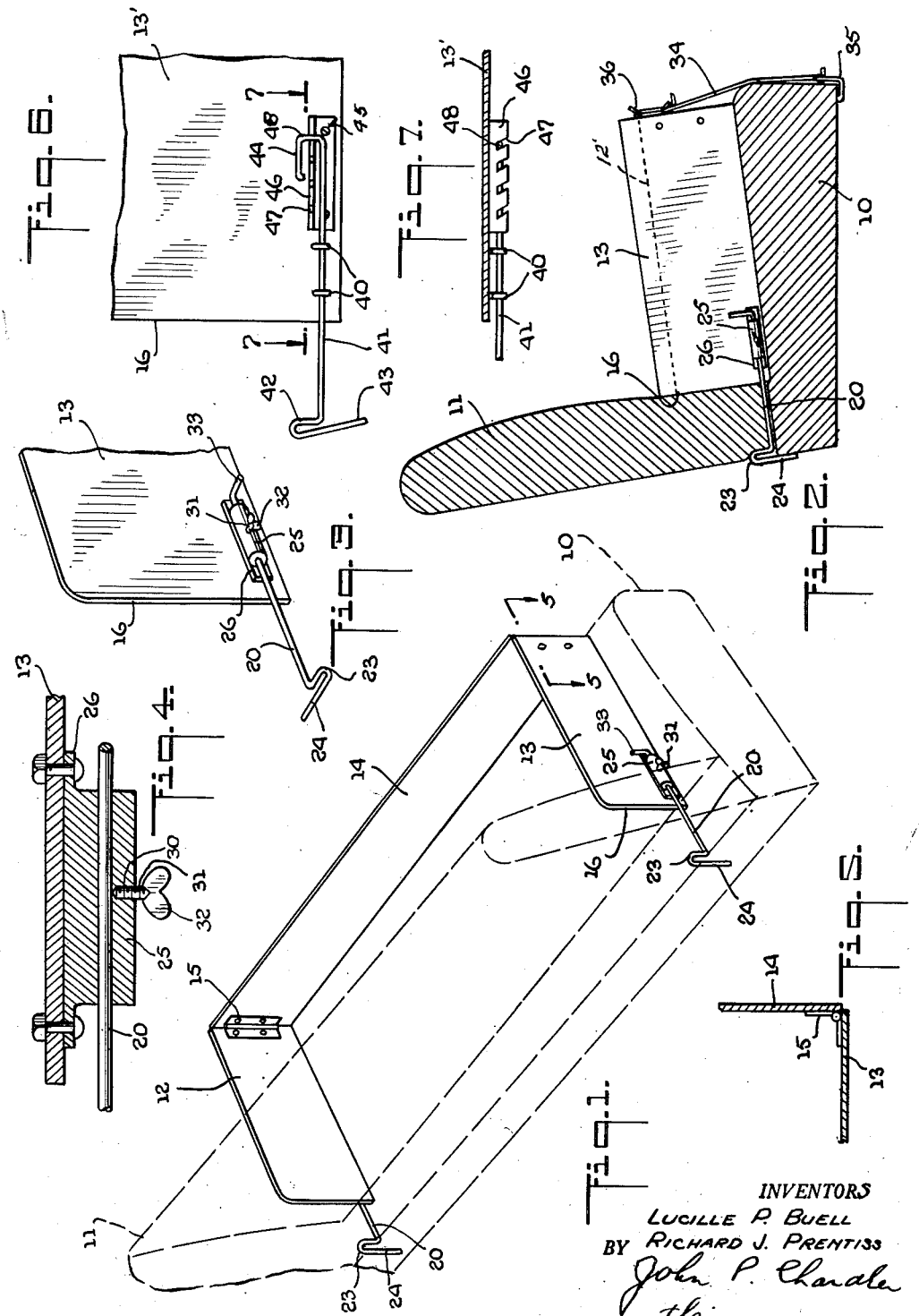

---

2,791,269

ENCLOSURE FOR CONVERTING A SEAT INTO A BED

Lucille P. Buell, New York, and Richard J. Prentiss, Hewlett, N. Y.

Application August 13, 1953, Serial No. 374,014

2 Claims. (Cl. 155—189)

This invention relates to automobile accessories and relates more particularly to a novel seat attachment for automobiles which is particularly useful in forming a bed for babies and to protect them from falling off the seat in the event of a sudden stop.

An important object of the present invention is to provide a protective wall arrangement to form, in combination with the front or back seat of a car, a bed for babies and wherein the protective wall is positively secured against dislocation.

The article of the present invention is particularly useful for converting a vehicle seat into a bed for infants but it also is especially useful for providing a carrier for any article which the driver wishes to transport on the car seat and wherein it is desirable that the possibility of the article falling to the floor be eliminated.

The article of the present invention takes the place of hammocks and other carriers which are usually hung on the front or back of the car and thus utilizes the soft cushion of the car and provides a completely safe carrier which will not interfere with the driver.

Another object of the invention is to provide a novel hook arrangement for securing a member to a car seat which is readily manipulated to provide a firm attachment and can be released with equal facility.

In the drawing:

Fig. 1 is a perspective view of the accessory of the present invention and shows the method of attachment to the automobile seat.

Fig. 2 shows a vertical section taken through the seat and showing the accessory secured in place.

Fig. 3 is a perspective view of the attaching member secured to one of the end walls.

Fig. 4 is a horizontal section taken through the supporting bracket for the hook-shaped rod.

Fig. 5 is a broken section taken on line 5—5 of Fig. 1.

Fig. 6 is a broken end elevation showing an alternative form of attaching member.

Fig. 7 is a broken section taken on line 7—7 of Fig. 6.

Fig. 2 shows a car seat at 10 and a seat back at 11. The article of the present invention includes opposed end wall sections 12 and 13 connected by a front wall section 14 by the use of hinges 15. If desired, end wall 12 may be of lesser depth than end wall 13, as shown at 12′ in Fig. 2. The accessory when not in use can be folded completely flat and thus occupy little space.

The object of the improved attaching means of the present invention is to cause the rear edges 16 of the end wall sections to press firmly against the front of the seat back. It includes a hook shaped member 20 which may be formed from a metal rod and is bent at its rear terminal to form an inverted U-shaped portion 23, the outer vertical leg 24 of which extends downwardly below the plane of the rod. The rod is mounted for sliding movement in a sleeve 25 having a base portion 26, which is secured to the end walls. The sleeve has a threaded opening 30 which receives a set screw 31 with a wing finger portion 32. At its outer end the rod has an offset portion 33 to aid in turning the rod.

To firmly hold the lower edges of the enclosure walls against the seat and particularly to prevent the forward edges from raising if a bump is encountered a securing cord 34 is secured to the center of front wall 14 of the enclosure, the cord carrying a hook 35 which engages the lower edge of seat 10. The cord is looped upwardly and is secured around a cleat 36 mounted on the front wall.

To affix the accessory to the seat the vertical wall members 12, 13 and 14 are placed upon the seat as shown in Fig. 2 and the inverted U-shaped section 23 occupies a horizontal position as shown in Fig. 3. The two rods 20 are then moved rearwardly under the lower edge of the seat back until the hook shaped portions are to the rear of the seat and seat back. The offset portions 33 are then rotated to bring the inverted U-shaped portion into vertical position, at which time the rod is drawn forwardly causing the hook shaped portion 23 to firmly engage the back surface of the seat back 11 and the downwardly extending leg 24 to engage the vertical rear surface of the seat 10. Thus the forward edges 16 of the opposed end walls are firmly pressed against the front of the seat back securing the accessory to the seat. The set screws are now tightened, the securing cord tightened, and the enclosure is ready for any use to which it is to be put such as a bed for a baby or a holder for articles carried on the seat.

In the modified form of the invention shown in Figs. 6 and 7 the end wall 13′ is provided with two rings 40 and a rod 41 is again provided with an inverted U-shaped portion 42 and a downwardly extending terminal portion 43. The hook shaped element is shown here in slightly modified shape in that the lower terminal thereof extends downwardly and forwardly, which construction better fits certain types of seats.

At its forward end the rod is formed with upwardly extending portion 44. In this instance the means for securing the rod in an adjusted fixed position include an angle bracket with a vertical portion 45 and a horizontal portion 46. This portion has a plurality of diagonally inclined notches 47 to receive the vertical portion 48 of the rod. This embodiment of the invention may be attached to the seat in substantially the same fashion as the first form.

If desired, front wall 14 of the enclosure may have a number of leg openings for the child, thus making the enclosure useful as a seat for the child while affording a protective front wall to prevent the child from falling forward in the event of a sudden stop.

While two forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. An enclosure for converting a car seat having a seat back into a bed and including opposed end walls and a connecting front wall hingedly carried at the forward terminals of the end walls, and a securing member on each end wall comprising a rod which is mounted for sliding movement longitudinally of the end wall and having an inverted U-shaped hook portion extending upwardly from its rear terminal which engages the lower edge of the seat back, a sleeve on the end wall providing said slidable mounting for the rod, the outer leg of the hook portion extending below the rod and which engages the rear edge of the seat, an offset handle portion at the forward end of the rod, and means comprising a set screw carried by the sleeve for securing the rod in an adjusted fixed portion while the rear terminals of the end walls are in firm engagment with the seat back.

2. An enclosure for converting a car seat having a seat back into a bed and including opposed end walls and a connecting front wall hingedly carried at the forward terminals of the end walls, a sleeve mounted horizontally on each end wall, and a securing member comprising a rod mounted for sliding movement in the sleeve and having an inverted U-shaped hook portion extending upwardly from its rear terminal which engages the lower edge of the seat back, the outer leg of the hook portion extending below the rod and which engages the rear edge of the seat, an offset handle portion at the forward end of the rod, and means for securing the rod against rearward movement when the seat back is clamped between the hook portion and the rear vertical edges of the side walls.

References Cited in the file of this patent

UNITED STATES PATENTS

| | | |
|---|---|---|
| 1,623,259 | McGregor et al. | Apr. 5, 1927 |
| 1,747,831 | Hess | Feb. 18, 1930 |
| 2,066,557 | Cox | Jan. 5, 1937 |
| 2,308,315 | Smith | Jan. 12, 1943 |
| 2,369,552 | Ferran | Feb. 13, 1945 |
| 2,532,007 | Biasell | Nov. 28, 1950 |
| 2,544,428 | Judy | Mar. 6, 1951 |
| 2,595,329 | Brooks | May 6, 1952 |
| 2,636,548 | Berlin | Apr. 28, 1953 |